US007391870B2

(12) United States Patent
Herre et al.

(10) Patent No.: US 7,391,870 B2
(45) Date of Patent: Jun. 24, 2008

(54) APPARATUS AND METHOD FOR GENERATING A MULTI-CHANNEL OUTPUT SIGNAL

(75) Inventors: Jürgen Herre, Buckhof (DE); Christof Faller, Trägerwilen (CH); Sascha Disch, Fürth (DE); Johannes Hilpert, Nürnberg (DE)

(73) Assignees: Fraunhofer-Gesellschaft zur Foerderung der Angewandten Forschung E V, Munich (DE); Agere Systems Inc., Allentown, PA (US)

( * ) Notice: Subject to any disclaimer, the term of this patent is extended or adjusted under 35 U.S.C. 154(b) by 818 days.

(21) Appl. No.: 10/935,061

(22) Filed: Sep. 7, 2004

(65) Prior Publication Data

US 2006/0009225 A1 Jan. 12, 2006

Related U.S. Application Data

(60) Provisional application No. 60/586,578, filed on Jul. 9, 2004.

(51) Int. Cl.
*H04R 5/00* (2006.01)
*G06F 17/00* (2006.01)
*G10L 19/00* (2006.01)

(52) U.S. Cl. .............................. 381/23; 381/18; 700/94; 704/501

(58) Field of Classification Search ............. 381/22-23, 381/17, 18, 19, 80; 700/94; 704/500, 501
See application file for complete search history.

(56) References Cited

U.S. PATENT DOCUMENTS 5,583,962 A 12/1996 Davis et al.
5,890,125 A * 3/1999 Davis et al. ................. 704/501
6,021,205 A * 2/2000 Yamada et al. .............. 381/310

(Continued)

FOREIGN PATENT DOCUMENTS

EP 1 376 538 A1 1/2004

OTHER PUBLICATIONS

Erik Schuijers et al.: "Low complexity parametric stereo coding", *Audio Engineering Society, Convention Paper 6073, 116th Convention*, May 8-11, 2004, Berlin, Germany, pp. 1-11.

(Continued)

*Primary Examiner*—Xu Mei
(74) *Attorney, Agent, or Firm*—Laurence A. Greenberg; Werner H. Stemer; Ralph E. Locher

(57) ABSTRACT

An apparatus for generating a multi-channel output signal performs a center channel cancellation to obtain improved base channels for reconstructing left-side output channels or right-side output channels. In particular, the apparatus includes a cancellation channel calculator for calculating a cancellation channel using information related to the original center channel available at the decoder. The device furthermore includes a combiner for combining a transmission channel with the cancellation channel. Finally, the apparatus includes a reconstructor for generating the multi-channel output signal. Due to the center channel cancellation, the channel reconstructor not only uses a different base channel for reconstructing the center channel but also uses base channels different from the transmission channels for reconstructing left and right output channels which have a reduced or even completely cancelled influence of the original center channel.

21 Claims, 10 Drawing Sheets

U.S. PATENT DOCUMENTS

| | | | | |
|---|---|---|---|---|
| 6,763,115 | B1 | 7/2004 | Kobayashi | |
| 7,006,636 | B2 * | 2/2006 | Baumgarte et al. | 381/17 |
| 7,181,019 | B2 * | 2/2007 | Breebaart et al. | 381/23 |
| 7,292,901 | B2 * | 11/2007 | Baumgarte et al. | 700/94 |
| 2003/0026411 | A1 | 2/2003 | Faller | |
| 2003/0035553 | A1 | 2/2003 | Baumgarte et al. | |
| 2003/0219130 | A1 | 11/2003 | Baumgarte et al. | |

OTHER PUBLICATIONS

Christof Faller: "Coding of Spatial Audio Compatible with Different Playback Formats", *Audio Engineering Society, Convention Paper, 117th Convention*, Oct. 28-31, 2004, San Francisco, CA , pp. 1-12.

Christof Faller et al.: "Binaural Cue Coding—Part II: Schemes and Applications", *IEEE Transactions on Speech and Audio Processing*, vol. 11, No. 6, Nov. 2003, pp. 520-531.

Jürgen Herre et al.: "Intensity Stereo Coding", *AES 96th Convention*, Feb. 26-Mar. 1, 1994, Amsterdam, Netherlands, *AES preprint 3799*, pp. 1-10.

Christof Faller et al.: "Binaural Cue Coding Applied to Stereo and Multi-Channel Audio Compression", Audio Engineering Society, Convention Paper 5574, 112th *Convention*, May 10-13, 2002, Munich, Germany, pp. 1-9.

Christof Faller et al.: "Binaural Cue Coding, Part II: Schemes and Applicaitons", *IEEE Transaction on Speech and Audio Processing*, vol. XX, No. Y, Month 2002, p. 1-12.

Günther Theile et al.: "MUSICAM-Surround: A Universal Multi-Channel Coding System Compatible with ISO 11172-3", *Audio Engineering Society, Convention Paper 3403, 93rd Convention*, Oct. 1-4, 1992, San Francisco, pp. 1-9.

B. Grill et al.: "Improved MPEG-2 Audio Multi-Channel Encoding", *Audio Engineering Society, Convention Paper 3865, 96th Convention*, Feb. 26-Mar. 1, 1994, Amsterdam, Netherlands, pp. 1-9.

Frank Baumgarte et al.: "Binaural Cue Coding—Part 1: Psychoacoustic Fundamentals and Design Principles", *IEEE Transactions on Speech and Audio processing*, vol. 11, No. 6, Nov. 2003, pp. 509-519.

Reommendation ITU-R BS 775-1: "Multichannel stereophonic sound system with and without accompanying picture", 11pgs, 1992-1994.

Juergen Herre et al.: "MP3 Surround: Efficient and Compatible Coding of Multi-Channel Audio", *Audio Engineering Society, Convention Paper 6049, 116th Convention*, May 8-11, 2004, Berlin, Germany, pp. 1-14.

Joseph Hull: "Surround Sound Past, Present, and Future", *Dolby Laboratories*, 1999, pp. 1-7.

Roger Dressler: "Dolby Surround Pro Logic II Decoder Principles of Operation", *Dolby Laboratories, Inc.*, 2000, pp. 1-7.

Jürgen Herre et al.: "Combined Stereo Coding", *Audio Engineering Society, Convention Paper 3369, 96th Convention*, Oct. 1-4, 1992, San Francisco, pp. 1-17.

Dolby Laboratories, Inc. User's Manual: "Dolby DP563 Dolby Surround and Pro Logic II Encoder", *Issue 3*, 2003 .

Minnetonka Audio Owner's Manual: "SurCode for Dolby Pro Logic II", pp. 1-23, 2003.

* cited by examiner $$U_{25}=\begin{bmatrix} 1-a_3(k)/\sqrt{2} & -a_3(k)/\sqrt{2} \\ -a_3(k)/\sqrt{2} & 1-a_3(k)/\sqrt{2} \\ 1 & 1 \\ 1-a_3(k)/\sqrt{2} & -a_3(k)/\sqrt{2} \\ -a_3(k)/\sqrt{2} & 1-a_3(k)/\sqrt{2} \end{bmatrix}$$

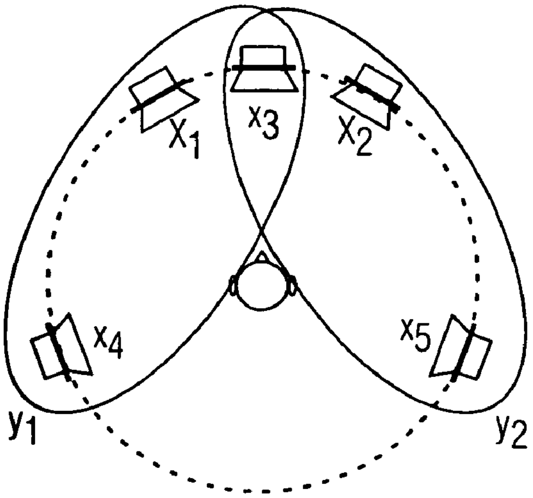
$$IN_5 = \begin{bmatrix} \text{left} \\ \text{right} \\ \text{center} \\ \text{rear - left} \\ \text{rear - right} \end{bmatrix}$$
FIG. 6A
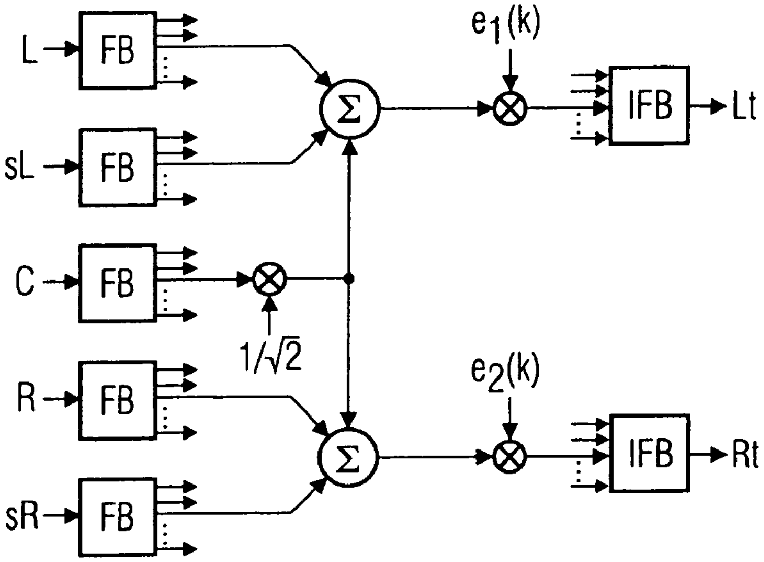
FIG. 6B
$$D_{52} = \begin{bmatrix} 1 & 0 & 1/\sqrt{2} & 1 & 0 \\ 0 & 1 & 1/\sqrt{2} & 0 & 1 \end{bmatrix}$$
FIG. 6C

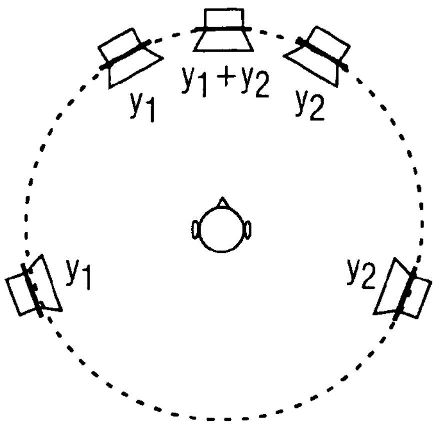
FIG. 7A
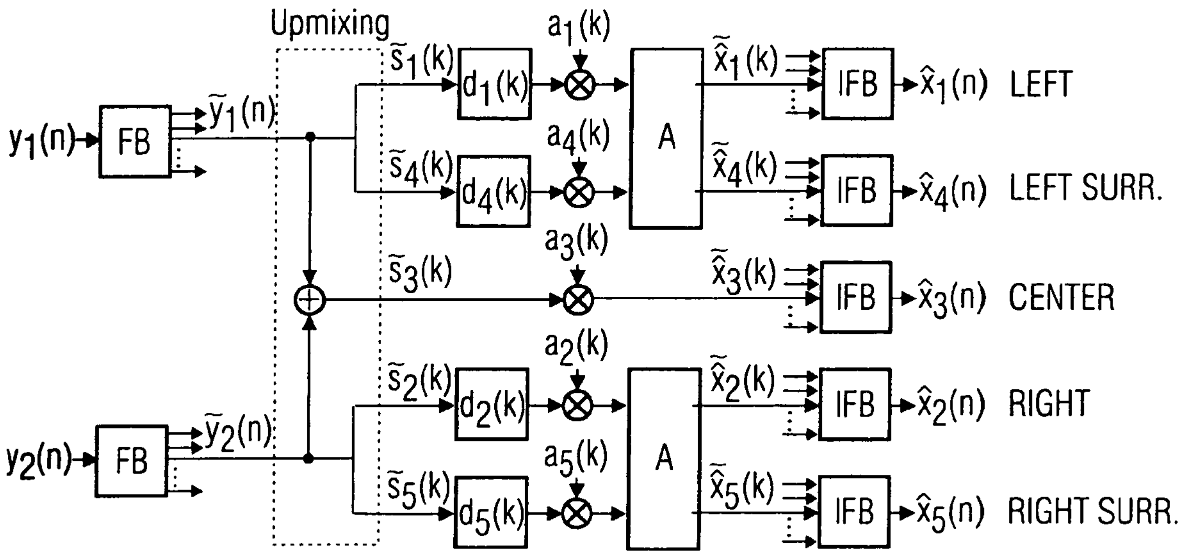
FIG. 7B
$$U_{25}=\begin{bmatrix}1 & 0\\ 0 & 1\\ 1 & 1\\ 1 & 0\\ 0 & 1\end{bmatrix}$$
FIG. 7C -Level Modification for each channel $$F_i = 10^{\Delta Li/20} \cdot F_{ref} \ ; \ F_{ref} = y_1 + y_2$$

$$a_i = 10^{\Delta Li/20}$$

-Overall Normalization
(Energy of all output channels is equal to energy of all transmitted channels)

$$F_{ref} = \frac{1}{\sqrt{\sum_i 10^{\Delta Li/10}}}$$

$F_i$: one of the output channel having index i
$\Delta Li$: I. into channel level Difference between input channel i and a reference channel
$F_{ref}$: reference channel (such as $y_1 + y_2$)
i: channel index; i=1...C
C: total number of input channels

FIG. 7D

APPARATUS AND METHOD FOR GENERATING A MULTI-CHANNEL OUTPUT SIGNAL

CROSS-REFERENCE TO RELATED APPLICATIONS

This application claims the benefit of U.S. provisional application No. 60/586,578, which is herewith incorporated by reference in its entirety.

FIELD OF THE INVENTION

The present invention relates to multi-channel decoding and, particularly, to multi-channel decoding, in which at least two transmission channels are present, i.e. which is stereo-compatible.

In recent times, the multi-channel audio reproduction technique is becoming more and more important. This may be due to the fact that audio compression/encoding techniques such as the well-known mp3 technique have made it possible to distribute audio records via the Internet or other transmission channels having a limited bandwidth. The mp3 coding technique has become so famous because of the fact that it allows distribution of all the records in a stereo format, i.e., a digital representation of the audio record including a first or left stereo channel and a second or right stereo channel.

Nevertheless, there are basic shortcomings of conventional two-channel sound systems. Therefore, the surround technique has been developed. A recommended multi-channel-surround representation includes, in addition to the two stereo channels L and R, an additional center channel C and two surround channels Ls, Rs. This reference sound format is also referred to as three/two-stereo, which means three front channels and two surround channels. Generally, five transmission channels are required. In a playback environment, at least five speakers at the respective five different places are needed to get an optimum sweet spot in a certain distance from the five well-placed loudspeakers.

Several techniques are known in the art for reducing the amount of data required for transmission of a multi-channel audio signal. Such techniques are called joint stereo techniques. To this end, reference is made to FIG. 10, which shows a joint stereo device 60. This device can be a device implementing e.g. intensity stereo (IS) or binaural cue coding (BCC). Such a device generally receives—as an input—at least two channels (CH1, CH2, . . . CHn), and outputs a single carrier channel and parametric data. The parametric data are defined such that, in a decoder, an approximation of an original channel (CH1, CH2, . . . CHn) can be calculated.

Normally, the carrier channel will include subband samples, spectral coefficients, time domain samples etc, which provide a comparatively fine representation of the underlying signal, while the parametric data do not include such samples of spectral coefficients but include control parameters for controlling a certain reconstruction algorithm such as weighting by multiplication, time shifting, frequency shifting, . . . The parametric data, therefore, include only a comparatively coarse representation of the signal or the associated channel. Stated in numbers, the amount of data required by a carrier channel will be in the range of 60-70 kbit/s, while the amount of data required by parametric side information for one channel will be in the range of 1,5-2,5 kbit/s. An example for parametric data are the well-known scale factors, intensity stereo information or binaural cue parameters as will be described below.

Intensity stereo coding is described in AES preprint 3799, "Intensity Stereo Coding", J. Herre, K. H. Brandenburg, D. Lederer, February 1994, Amsterdam. Generally, the concept of intensity stereo is based on a main axis transform to be applied to the data of both stereophonic audio channels. If most of the data points are concentrated around the first principle axis, a coding gain can be achieved by rotating both signals by a certain angle prior to coding. This is, however, not always true for real stereophonic production techniques. Therefore, this technique is modified by excluding the second orthogonal component from transmission in the bit stream. Thus, the reconstructed signals for the left and right channels consist of differently weighted or scaled versions of the same transmitted signal. Nevertheless, the reconstructed signals differ in their amplitude but are identical regarding their phase information. The energy-time envelopes of both original audio channels, however, are preserved by means of the selective scaling operation, which typically operates in a frequency selective manner. This conforms to the human perception of sound at high frequencies, where the dominant spatial cues are determined by the energy envelopes.

Additionally, in practically implementations, the transmitted signal, i.e. the carrier channel is generated from the sum signal of the left channel and the right channel instead of rotating both components. Furthermore, this processing, i.e., generating intensity stereo parameters for performing the scaling operation, is performed frequency selective, i.e., independently for each scale factor band, i.e., encoder frequency partition. Preferably, both channels are combined to form a combined or "carrier" channel, and, in addition to the combined channel, the intensity stereo information is determined which depend on the energy of the first channel, the energy of the second channel or the energy of the combined or channel.

The BCC technique is described in AES convention paper 5574, "Binaural cue coding applied to stereo and multi-channel audio compression", C. Faller, F. Baumgarte, May 2002, Munich. In BCC encoding, a number of audio input channels are converted to a spectral representation using a DFT based transform with overlapping windows. The resulting uniform spectrum is divided into non-overlapping partitions each having an index. Each partition has a bandwidth proportional to the equivalent rectangular bandwidth (ERB).

The inter-channel level differences (ICLD) and the inter-channel time differences (ICTD) are estimated for each partition for each frame k. The ICLD and ICTD are quantized and coded resulting in a BCC bit stream. The inter-channel level differences and inter-channel time differences are given for each channel relative to a reference channel. Then, the parameters are calculated in accordance with prescribed formulae, which depend on the certain partitions of the signal to be processed.

At a decoder-side, the decoder receives a mono signal and the BCC bit stream. The mono signal is transformed into the frequency domain and input into a spatial synthesis block, which also receives decoded ICLD and ICTD values. In the spatial synthesis block, the BCC parameters (ICLD and ICTD) values are used to perform a weighting operation of the mono signal in order to synthesize the multi-channel signals, which, after a frequency/time conversion, represent a reconstruction of the original multi-channel audio signal.

In case of BCC, the joint stereo module 60 is operative to output the channel side information such that the parametric channel data are quantized and encoded ICLD or ICTD parameters, wherein one of the original channels is used as the reference channel for coding the channel side information.

Normally, the carrier channel is formed of the sum of the participating original channels.

Naturally, the above techniques only provide a mono representation for a decoder, which can only process the carrier channel, but is not able to process the parametric data for generating one or more approximations of more than one input channel.

The audio coding technique known as binaural cue coding (BCC) is also well described in the United States patent application publications U.S. 2003, 0219130 A1, 2003/0026441 A1 and 2003/0035553 A1. Additional reference is also made to "Binaural Cue Coding. Part II: Schemes and Applications", C. Faller and F. Baumgarte, IEEE Trans. On Audio and Speech Proc., Vol. 11, No. 6, November 2993. The cited United States patent application publications and the two cited technical publications on the BCC technique authored by Faller and Baumgarte are incorporated herein by reference in their entireties.

In the following, a typical generic BCC scheme for multi-channel audio coding is elaborated in more detail with reference to FIGS. 11 to 13. FIG. 11 shows such a generic binaural cue coding scheme for coding/transmission of multi-channel audio signals. The multi-channel audio input signal at an input 110 of a BCC encoder 112 is downmixed in a downmix block 114. In the present example, the original multi-channel signal at the input 110 is a 5-channel surround signal having a front left channel, a front right channel, a left surround channel, a right surround channel and a center channel. For example, the downmix block 114 produces a sum signal by a simple addition of these five channels into a mono signal. Other downmixing schemes are known in the art such that, using a multi-channel input signal, a downmix signal having a single channel can be obtained. This single channel is output at a sum signal line 115. A side information obtained by a BCC analysis block 116 is output at a side information line 117. In the BCC analysis block, inter-channel level differences (ICLD), and inter-channel time differences (ICTD) are calculated as has been outlined above. Recently, the BCC analysis block 116 has been enhanced to also calculate inter-channel correlation values (ICC values). The sum signal and the side information is transmitted, preferably in a quantized and encoded form, to a BCC decoder 120. The BCC decoder decomposes the transmitted sum signal into a number of subbands and applies scaling, delays and other processing to generate the subbands of the output multi-channel audio signals.

This processing is performed such that ICLD, ICTD and ICC parameters (cues) of a reconstructed multi-channel signal at an output 121 are similar to the respective cues for the original multi-channel signal at the input 110 into the BCC encoder 112. To this end, the BCC decoder 120 includes a BCC synthesis block 122 and a side information processing block 123.

In the following, the internal construction of the BCC synthesis block 122 is explained with reference to FIG. 12. The sum signal on line 115 is input into a time/frequency conversion unit or filter bank FB 125. At the output of block 125, there exists a number N of sub band signals or, in an extreme case, a block of a spectral coefficients, when the audio filter bank 125 performs a 1:1 transform, i.e., a transform which produces N spectral coefficients from N time domain samples.

The BCC synthesis block 122 further comprises a delay stage 126, a level modification stage 127, a correlation processing stage 128 and an inverse filter bank stage IFB 129. At the output of stage 129, the reconstructed multi-channel audio signal having for example five channels in case of a 5-channel surround system, can be output to a set of loudspeakers 124 as illustrated in FIG. 11.

As shown in FIG. 12, the input signal s(n) is converted into the frequency domain or filter bank domain by means of element 125. The signal output by element 125 is multiplied such that several versions of the same signal are obtained as illustrated by multiplication node 130. The number of versions of the original signal is equal to the number of output channels in the output signal, to be reconstructed When, in general, each version of the original signal at node 130 is subjected to a certain delay $d_1, d_2, \ldots, d_i, \ldots, d_N$. The delay parameters are computed by the side information processing block 123 in FIG. 11 and are derived from the inter-channel time differences as determined by the BCC analysis block 116.

The same is true for the multiplication parameters $a_1, a_2, \ldots, a_i, \ldots, a_N$, which are also calculated by the side information processing block 123 based on the inter-channel level differences as calculated by the BCC analysis block 116.

The ICC parameters calculated by the BCC analysis block 116 are used for controlling the functionality of block 128 such that certain correlations between the delayed and level-manipulated signals are obtained at the outputs of block 128. It is to be noted here that the order between the stages 126, 127, 128 may be different from the case shown in FIG. 12.

It is to be noted here that, in a frame-wise processing of an audio signal, the BCC analysis is performed frame-wise, i.e. time-varying, and also frequency-wise. This means that, for each spectral band, the BCC parameters are obtained. This means that, in case the audio filter bank 125 decomposes the input signal into for example 32 band pass signals, the BCC analysis block obtains a set of BCC parameters for each of the 32 bands. Naturally the BCC synthesis block 122 from FIG. 11, which is shown in detail in FIG. 12, performs a reconstruction which is also based on the 32 bands in the example.

In the following, reference is made to FIG. 13 showing a setup to determine certain BCC parameters. Normally, ICLD, ICTD and ICC parameters can be defined between pairs of channels. However, it is preferred to determine ICLD and ICTD parameters between a reference channel and each other channel. This is illustrated in FIG. 13A.

ICC parameters can be defined in different ways. Most generally, one could estimate ICC parameters in the encoder between all possible channel pairs as indicated in FIG. 13B. In this case, a decoder would synthesize ICC such that it is approximately the same as in the original multi-channel signal between all possible channel pairs. It was, however, proposed to estimate only ICC parameters between the strongest two channels at each time. This scheme is illustrated in FIG. 13C, where an example is shown, in which at one time instance, an ICC parameter is estimated between channels 1 and 2, and, at another time instance, an ICC parameter is calculated between channels 1 and 5. The decoder then synthesizes the inter-channel correlation between the strongest channels in the decoder and applies some heuristic rule for computing and synthesizing the inter-channel coherence for the remaining channel pairs.

Regarding the calculation of, for example, the multiplication parameters $a_1$, $a_N$ based on transmitted ICLD parameters, reference is made to AES convention paper 5574 cited above. The ICLD parameters represent an energy distribution in an original multi-channel signal. Without loss of generality, it is shown in FIG. 13A that there are four ICLD parameters showing the energy difference between all other channels and the front left channel. In the side information processing block 123, the multiplication parameters $a_1, \ldots, a_N$ are derived from the ICLD parameters such that the total energy of all reconstructed output channels is the same as (or proportional to) the energy of the transmitted sum signal. A simple way for determining these parameters is a 2-stage process, in which, in a first stage, the multiplication factor for the left front channel is set to unity, while multiplication factors for the other channels in FIG. 13A are set to the transmitted ICLD values. Then, in a second stage, the energy of all five channels is calculated and compared to the energy of the transmitted sum signal. Then, all channels are downscaled using a downscaling factor which is equal for all channels, wherein the downscaling factor is selected such that the total energy of all reconstructed output channels is, after downscaling, equal to the total energy of the transmitted sum signal.

Naturally, there are other methods for calculating the multiplication factors, which do not rely on the 2-stage process but which only need a 1-stage process.

Regarding the delay parameters, it is to be noted that the delay parameters ICTD, which are transmitted from a BCC encoder can be used directly, when the delay parameter $d_1$ for the left front channel is set to zero. No resealing has to be done here, since a delay does not alter the energy of the signal.

Regarding the inter-channel coherence measure ICC transmitted from the BCC encoder to the BCC decoder, it is to be noted here that a coherence manipulation can be done by modifying the multiplication factors $a_1, \ldots, a_n$ such as by multiplying the weighting factors of all subbands with random numbers with a range of [20log10(−6) and 20log10(6)]. The pseudo-random sequence is preferably chosen such that the variance is approximately constant for all critical bands, and the average is zero within each critical band. The same sequence is applied to the spectral coefficients for each different frame. Thus, the auditory image width is controlled by modifying the variance of the pseudo-random sequence. A larger variance creates a larger image width. The variance modification can be performed in individual bands that are critical-band wide. This enables the simultaneous existence of multiple objects in an auditory scene, each object having a different image width. A suitable amplitude distribution for the pseudo-random sequence is a uniform distribution on a logarithmic scale as it is outlined in the US patent application publication 2003/0219130 A1. Nevertheless, all BCC synthesis processing is related to a single input channel transmitted as the sum signal from the BCC encoder to the BCC decoder as shown in FIG. 11.

To transmit the five channels in a compatible way, i.e., in a bitstream format, which is also understandable for a normal stereo decoder, the so-called matrixing technique has been used as described in "MUSICAM surround: a universal multi-channel coding system compatible with ISO 11172-3", G. Theile and G. Stoll, AES preprint 3403, October 1992, San Francisco. The five input channels L, R, C, Ls, and Rs are fed into a matrixing device performing a matrixing operation to calculate the basic or compatible stereo channels Lo, Ro, from the five input channels. In particular, these basic stereo channels Lo/Ro are calculated as set out below:

$$Lo=L+xC+yLs$$

$$Ro=R+xC+yRs$$

x and y are constants. The other three channels C, Ls, Rs are transmitted as they are in an extension layer, in addition to a basic stereo layer, which includes an encoded version of the basic stereo signals Lo/Ro. With respect to the bitstream, this Lo/Ro basic stereo layer includes a header, information such as scale factors and subband samples. The multi-channel extension layer, i.e., the central channel and the two surround channels are included in the multi-channel extension field, which is also called ancillary data field.

At a decoder-side, an inverse matrixing operation is performed in order to form reconstructions of the left and right channels in the five-channel representation using the basic stereo channels Lo, Ro and the three additional channels. Additionally, the three additional channels are decoded from the ancillary information in order to obtain a decoded five-channel or surround representation of the original multi-channel audio signal.

Another approach for multi-channel encoding is described in the publication "Improved MPEG-2 audio multi-channel encoding", B. Grill, J. Herre, K. H. Brandenburg, E. Eberlein, J. Koller, J. Mueller, AES preprint 3865, February 1994, Amsterdam, in which, in order to obtain backward compatibility, backward compatible modes are considered. To this end, a compatibility matrix is used to obtain two so-called downmix channels Lc, Rc from the original five input channels. Furthermore, it is possible to dynamically select the three auxiliary channels transmitted as ancillary data.

In order to exploit stereo irrelevancy, a joint stereo technique is applied to groups of channels, e.g. the three front channels, i.e., for the left channel, the right channel and the center channel. To this end, these three channels are combined to obtain a combined channel. This combined channel is quantized and packed into the bitstream. Then, this combined channel together with the corresponding joint stereo information is input into a joint stereo decoding module to obtain joint stereo decoded channels, i.e., a joint stereo decoded left channel, a joint stereo decoded right channel and a joint stereo decoded center channel. These joint stereo decoded channels are, together with the left surround channel and the right surround channel input into a compatibility matrix block to form the first and the second downmix channels Lc, Rc. Then, quantized versions of both downmix channels and a quantized version of the combined channel are packed into the bitstream together with joint stereo coding parameters.

Using intensity stereo coding, therefore, a group of independent original channel signals is transmitted within a single portion of "carrier" data. The decoder then reconstructs the involved signals as identical data, which are rescaled according to their original energy-time envelopes. Consequently, a linear combination of the transmitted channels will lead to results, which are quite different from the original downmix. This applies to any kind of joint stereo coding based on the intensity stereo concept. For a coding system providing compatible downmix channels, there is a direct consequence: The reconstruction by dematrixing, as described in the previous publication, suffers from artifacts caused by the imperfect reconstruction. Using a so-called joint stereo predistortion scheme, in which a joint stereo coding of the left, the right and the center channels is performed before matrixing in the encoder, alleviates this problem. In this way, the dematrixing scheme for reconstruction introduces fewer artifacts, since, on the encoder-side, the joint stereo decoded signals have been used for generating the downmix channels. Thus, the imperfect reconstruction process is shifted into the compatible downmix channels Lc and Rc, where it is much more likely to be masked by the audio signal itself.

Although such a system has resulted in fewer artifacts because of dematrixing on the decoder-side, it nevertheless has some drawbacks. A drawback is that the stereo-compatible downmix channels Lc and Rc are derived not from the original channels but from intensity stereo coded/decoded versions of the original channels. Therefore, data losses because of the intensity stereo coding system are included in the compatible downmix channels. A stereo-only decoder, which only decodes the compatible channels rather than the enhancement intensity stereo encoded channels, therefore, provides an output signal, which is affected by intensity stereo induced data losses.

Additionally, a full additional channel has to be transmitted besides the two downmix channels. This channel is the combined channel, which is formed by means of joint stereo coding of the left channel, the right channel and the center channel. Additionally, the intensity stereo information to reconstruct the original channels L, R, C from the combined channel also has to be transmitted to the decoder. At the decoder, an inverse matrixing, i.e., a dematrixing operation is performed to derive the surround channels from the two downmix channels. Additionally, the original left, right and center channels are approximated by joint stereo decoding using the transmitted combined channel and the transmitted joint stereo parameters. It is to be noted that the original left, right and center channels are derived by joint stereo decoding of the combined channel.

An enhancement of the BCC scheme shown in FIG. 11 is a BCC scheme with at least two audio transmission channels so that a stereo-compatible processing is obtained. In the encoder, C input channels are downmixed to E transmit audio channels. The ICTD, ICLD and ICC cues between certain pairs of input channels are estimated as a function of frequency and time. The estimated cues are transmitted to the decoder as side information. A BCC scheme with C input channels and E transmission channels is denoted C-2-E BCC.

Generally speaking, BCC processing is a frequency selective, time variant post processing of the transmitted channels. In the following, with the implicit understanding of this, a frequency band index will not be introduced.

Instead, variables like $x_n$, $s_n$, $y_n$, $a_n$, etc. are assumed to be vectors with dimension (1,f), wherein f denotes the number of frequency bands.

The so-called regular BCC scheme is described in C. Faller and F. Baumgarte, "Binaural Cue Coding applied to stereo and multi-channel audio compression," in *Preprint* 112$^{th}$ *Conv. Aud. Engl. Soc.*, May 2002, F. Baumgarte and C. Faller, "Binaural Cue Coding—Part I: Psychoacoustic fundamentals and design principles," *IEEE Trans. On Speech and Audio Proc.*, vol. 11, no. 6, November 2003, and C. Faller and F. Baumgarte, "Binaural Cue Coding—Part II; Schemes and applications," *IEEE Trans. On Speech and Audio Proc.*, vol. 11, no. 6, November 2003. Here, one has a single transmitted audio channel as shown in FIG. 11, is a backwards compatible extension of existing mono systems for stereo or multi-channel audio playback. Since the transmitted single audio channel is a valid mono signal, it is suitable for playback by legacy receivers.

However, most of the installed audio broadcasting infrastructure (analog and digital radio, television, etc.) and audio storage systems (vinyl discs, compact cassette, compact disc, VHS video, MP3 sound storage, etc.) are based on two-channel stereo. On the other hand, "home theater systems" conforming to the 5.1 standard (Rec. ITU-R BS.775, *Multi-Channel Stereophonic Sound System with or without Accompanying Picture*, ITU, 1993, http://www.itu.org) are becoming more popular. Thus, BCC with two transmission channels (C-to-2 BCC), as it is described in J. Herre, C. Faller, C. Ertel, J. Hilpert, A. Hoelzer, and C. Spenger, "MP3 Surround: Efficient and compatible coding of multi-channel audio," in *Preprint* 116$^{th}$ *Conv. Aud. Eng. Soc.*, May 2004, is particularly interesting for extending the existing stereo systems for multi-channel surround. In this connection, reference is also made to US patent application "Apparatus and method for constructing a multi-channel output signal or for generating a downmix signal", U.S. Ser. No. 10/762,100, filed on Jan. 20, 2004.

In the analog domain, matrixing algorithms such as "Dolby Surround", "Dolby Pro Logic", and "Dolby Pro Logic II" (J. Hull, "Surround sound past, present, and future," Techn. Rep., Dolby Laboratories, 1999, www.dolby.com/tech/; R. Dressler, "Dolby Surround Prologic II Decoder—Principles of operation," Techn Rep., Dolby Laboratories, 2000, www-.dolby.com/tech/) have been popular for years. Such algorithms apply "matrixing" for mapping the 5.1 audio channels to a stereo compatible channel pair. However, matrixing algorithms only provide significantly reduced flexibility and quality compared to discrete audio channels as it is outlined in J. Herre, C. Faller, C. Ertel, J. Hilpert, A. Hoelzer, and C. Spenger, "MP3 Surround: Efficient and compatible coding of multi-channel audio," in *Preprint* 116$^{th}$ *Conv. Aud. Eng. Soc.*, May 2004. If limitations of matrixing algorithms are already considered when mixing audio signals for 5.1 surround, some of the effects of this imperfection can be reduced as it is outlined in J. Hilson, "Mixing with Dolby Pro Logic II Technology," Tech. Rep., Dolby Laboratories, 2004, www.dolby-.com/tech/PLII.Mixing.JimHilson.html.

C-to-2 BCC can be viewed as a scheme with similar functionality as a matrixing algorithm with additional helper side information. It is, however, more general in its nature, since it supports mapping from any number of original channels to any number of transmitted channels. C-to-E BCC is intended for the digital domain and its low bitrate additional side information usually can be included into the existing data transmission in a backwards compatible way. This means that legacy receivers will ignore the additional side information and play back the 2 transmitted channels directly as it is outlined in J. Herre, C. Faller, C. Ertel, J. Hilpert, A. Hoelzer, and C. Spenger, "MP3 Surround: Efficient and compatible coding of multi-channel audio," in *Preprint* 116$^{th}$ *Conv. Aud. Eng. Soc.*, May 2004. The ever-lasting goal is to achieve an audio quality similar to a discrete transmission of all original audio channels, i.e. significantly better quality than what can be expected from a conventional matrixing algorithm.

In the following, reference is made to FIG. 6*a* in order to illustrate the conventional encoder downmix operation to generate two transmission channels from five input channels, which are a left channel L or $x_1$, a right channel R or $x_2$, a center channel C or $x_3$, a left surround channel sL or $x_4$ and a right surround channel sR or $x_5$. The downmix situation is schematically shown in FIG. 6*a*. It becomes clear that the first transmission channel $y_1$ is formed using a left channel $x_1$, a center channel $x_3$ and the left surround channel $x_4$. Additionally, FIG. 6*a* makes clear that the right transmission channel $y_2$ is formed using the right channel $x_2$, the center channel $x_3$ and the right surround channel $x_5$.

The generally preferred downmixing rule or downmixing matrix is shown in FIG. 6*c*. It becomes clear that the center channel $x_3$ is weighted by a weighting factor $1/\sqrt{2}$, which means that the first half of the energy of the center channel $x_3$ is put into the left transmission channel or first transmission channel Lt, while the second half of the energy in the center channel is introduced into the second transmission channel or right transmission channel Rt. Thus, the downmix maps the input channels to the transmitted channels. The downmix is conveniently described by a (m,n) matrix, mapping n input samples to m output samples. The entries of this matrix are the weights applied to the corresponding channels before summing up to form the related output channel.

There exist different downmix methods which can be found in the ITU recommendations (Rec. ITU-R BS.775, *Multi-Channel Stereophonic Sound System with or without Accompanying Picture*, ITU, 1993, http://www.itu.org). Additionally, reference is made to J. Herre, C. Faller, C. Ertel, J. Hilpert, A. Hoelzer, and C. Spenger, "MP3 Surround: Efficient and compatible coding of multi-channel audio," in *Preprint* 116$^{th}$ *Conv. Aud. Eng. Soc.*, May 2004, Section 4.2 with respect to different downmix methods. The downmix can be performed either in time or in frequency domain. It might be time varying in a signal adaptive way or frequency (band) dependent. The channel assignment is shown by the matrix to the right of FIG. 6*a* and is given as follows:

$$IN_5 = \begin{bmatrix} \text{left} \\ \text{right} \\ \text{center} \\ \text{rear-left} \\ \text{rear-right} \end{bmatrix}$$

So, for the important case of 5-to-2 BCC, one transmitted channel is computed from right, rear right and center, and the other transmitted channel from left, rear left and center, corresponding to a downmixing matrix for example of $$D_{52} = \begin{bmatrix} 1 & 0 & \frac{1}{\sqrt{2}} & 1 & 0 \\ 0 & 1 & \frac{1}{\sqrt{2}} & 0 & 1 \end{bmatrix}$$

which is also shown in FIG. 6*c*.

In this downmix matrix, the weighting factors can be chosen such that the sum of the square of the values in each column is one, such that the power of each input signal contributes equally to the downmixed signals. Of course other downmixing schemes could be used as well.

In particular, reference is made to FIG. 6*b* or 7*b*, which shows a specific implementation of an encoder downmixing scheme. Processing for one subband is shown. In each subband, the scaling factors $e_1$ and $e_2$ are controlled to "equalize" the loudness of the signal components in the downmixed signal. In this case, the downmix is performed in frequency domain, with the variable n (FIG. 7*b*) designating a frequency domain subband time index and k being the index of the transformed time domain signal block. Particularly, attention is drawn to the weighting device for weighting the center channel before the weighted version of the center channel is introduced into the left transmission channel and the right transmission channel by the respective summing devices.

The corresponding upmix operation in the decoder is shown with respect to FIGS. 7*a*, 7*b* and 7*c*. In the decoder an upmix has to be calculated, which maps the transmitted channel to the output channels. The upmix is conveniently described by a (i,j) matrix (i rows, j columns), mapping i transmitted samples to j output samples. Once again, the entries of this matrix are the weights applied to the corresponding channels before summing up to form the related output channel. The upmix can be performed either in time or in frequency domain. Additionally, it might be time varying in a signal-adaptive way or frequency (band) dependent. As opposed to the downmix matrix, the absolute values of the matrix entries do not represent the final weights of the output channels, since these upmixed channels are further modified in case of BCC processing. In particular, the modification takes place using the information provided by the spatial cues like ICLD, etc. Here in this example, all entries are either set to 0 or 1.

FIG. 7*a* shows the upmixing situation for a 5-speaker surround system. Besides each speaker, the base channel used for BCC synthesis is shown. In particular, with respect to the left surround output channel, a first transmitted channel $y_1$ is used. The same is true for the left channel. This channel is used as a base channel, also termed the "left transmitted channel".

As to the right output channel and the right surround output channel, they also use the same channel, i.e. the second or right transmitted channel $y_2$. As to the center channel, it is to be noted here that the base channel for BCC center channel synthesis is formed in accordance with the upmixing matrix shown in FIG. 7*c*, i.e. by adding both transmitted channels.

The process of generating the 5-channel output signal, given the two transmitted channels is shown in FIG. 7*b*. Here, the upmix is done in frequency domain with the variable n denoting a frequency domain subband time index, and k being the index of the transformed time domain signal block. It is to be noted here that ICTD and ICC synthesis is applied between channel pairs for which the same base channel is used, i.e., between left and rear left, and between right and rear right, respectively. The two blocks denoted A in FIG. 7*b* includes schemes for 2-channel ICC synthesis.

The side information estimated at the encoder, which is necessary for computing all parameters for the decoder output signal synthesis includes the following cues: $\Delta L_{12}$, $\Delta L_{13}$, $\Delta L_{14}$, $\Delta L_{15}$, $\tau_{14}$, $\tau_{25}$, $c_{14}$, and $c_{25}$ ($\Delta L_{ij}$ is the level difference between channel i and j, $\tau_{ij}$ is the time difference between channel i and j, and $c_{ij}$ is a correlation coefficient between channel i and j). It is to be noted here that other level differences can also be used. The requirement exists that enough information is available at the decoder for computing e.g. the scale factors, delays etc. for BCC synthesis.

In the following, reference is made to FIG. 7*d* in order to further illustrate the level modification for each channel, i.e. the calculation of $a_i$ and the subsequent overall normalization, which is not shown in FIG. 7*b*. Preferably, inter-channel level differences $\Delta L_i$ are transmitted as side information, i.e. as ICLD. Applied to a channel signal, one has to use the exponential relation between the reference channel $F_{ref}$ and a channel to be calculated, i.e. $F_i$. This is shown at the top of FIG. 7*d*.

What is not shown in FIG. 7*b* is the subsequent or final overall normalization, which can take place before the correlation blocks A or after the correlation blocks A. When the correlation blocks affect the energy of the channels weighted by $a_i$, the overall normalization should take place after the correlation blocks A. To make sure that the energy of all output channels is equal to the energy of all transmitted channels, the reference channel is scaled as shown in FIG. 7*d*. Preferably, the reference channel is the root of the sum of the squared transmitted channels.

In the following, the problems associated with these downmixing/upmixing schemes are described. When the 5-to-2 BCC scheme as illustrated in FIG. 6 and FIG. 7 is considered, the following becomes clear.

The original center channel is introduced into both transmitted channels and, consequently, also into the reconstructed left and right output channels.

Additionally, in this scheme, the common center contribution has the same amplitude in both reconstructed output channels.

Furthermore, the original center signal is replaced during decoding by a center signal, which is derived from the transmitted left and right channels and, thus, cannot be independent from (i.e. uncorrelated to) the reconstructed left and right channels.

This effect has unfavorable consequences on the perceived sound quality for signals with a very wide sound image which is characterized by a high degree of decorrelation (i.e. low coherence) between all audio channels. An example for such signals is the sound of an applauding audience, when using different microphones with a wide enough spacing for generating the original multi-channel signals. For such signals, the sound image of the decoded sound becomes narrower and its natural wideness is reduced.

SUMMARY OF THE INVENTION

It is the object of the present invention to provide a higher-quality multi-channel reconstruction concept which results in a multi-channel output signal having an improved sound perception.

In accordance with the first aspect of this invention, this object is achieved by an apparatus for generating a multi-channel output signal having K output channels, the multi-channel output signal corresponding to a multi-channel input signal having C input channels, using E transmission channels, the E transmission channels representing a result of a downmix operation having C input channels as an input, and using parametric side information related to the input channels, wherein E is ≧2, C is >E, and K is >1 and ≦C, and wherein the downmix operation is effective to introduce a first input channel in a first transmission channel and in a second transmission channel, and to additionally introduce a second input channel in the first transmission channel, comprising: a cancellation channel calculator for calculating a cancellation channel using information related to the first input channel included in the first transmission channel, the second transmission channel or the parametric side information; a combiner for combining the cancellation channel and the first transmission channel or a processed version thereof to obtain a second base channel, in which an influence of the first input channel is reduced compared to the influence of the first input channel on the first transmission channel; and a channel reconstructor for reconstructing a second output channel corresponding to the second input channel using the second base channel and parametric side information related to the second input channel, and for reconstructing a first output channel corresponding to the first input channel using a first base channel being different from the second base channel in that the influence of the first channel is higher compared to the second base channel, and parametric side information related to the first input channel.

In accordance with a second aspect of the present invention, this object is achieved by a method of generating a multi-channel output signal having K output channels, the multi-channel output signal corresponding to a multi-channel input signal having C input channels, using E transmission channels, the E transmission channels representing a result of a downmix operation having C input channels as an input, and using parametric side information related to the input channels, wherein E is ≧2, C is >E, and K is >1 and ≦C, and wherein the downmix operation is effective to introduce a first input channel in a first transmission channel and in a second transmission channel, and to additionally introduce a second input channel in the first transmission channel, comprising: calculating a cancellation channel using information related to the first input channel included in the first transmission channel, the second transmission channel or the parametric side information; combining the cancellation channel and the first transmission channel or a processed version thereof to obtain a second base channel, in which an influence of the first input channel is reduced compared to the influence of the first input channel on the first transmission channel; and reconstructing a second output channel corresponding to the second input channel using the second base channel and parametric side information related to the second input channel, and a first output channel corresponding to the first input channel using a first base channel being different from the second base channel in that the influence of the first channel is higher compared to the second base channel, and parametric side information related to the first input channel.

In accordance with a third aspect of the present invention, this object is achieved by a computer program having a program code for performing the method for generating a multi-channel output signal, when the program runs on a computer.

It is to be noted here, that preferably, K is equal to C. Nevertheless, one could also reconstruct less output channels, such as three output channels L,R,C and not reconstructing Ls and Rs. In this case, the K (=3) output channels correspond to three of the original C (=5) input channels L,R,C.

The present invention is based on the finding that, for improving sound quality of the multi-channel output signal, a certain base channel is calculated by combining a transmitted channel and a cancellation channel, which is calculated at the receiver or decoder-end. The cancellation channel is calculated such that the modified base channel obtained by combining the cancellation channel and the transmitted channel has a reduced influence of the center channel, i.e. the channel which is introduced into both transmission channels. Stated in other words, the influence of the center channel, i.e. the channel which is introduced into both transmission channels, which inevitably occurs when downmixing and subsequent upmixing operations are performed, is reduced compared to a situation in which no such cancellation channel is calculated and combined to a transmission channel.

In contrast to the prior art, for example the left transmission channel is not simply used as the base channel for reconstructing the left or the left surround channel. In contrast thereto, the left transmission channel is modified by combining with the cancellation channel so that the influence of the original center input channel in the base channel for reconstructing the left or the right output channel is reduced or even completely cancelled.

Inventively, the cancellation channel is calculated at the decoder using information on the original center channel which are already present at the decoder or multi-channel output generator. Information on the center channel is included in the left transmitted channel, the right transmitted channel and the parametric side information such as in level differences, time differences or correlation parameters for the center channel. Depending on certain embodiments, all this information can be used to obtain a high-quality center channel cancellation. In other more low level embodiments, however, only a part of this information on the center input channel is used. This information can be the left transmission channel, the right transmission channel or the parametric side information. Additionally, one can also use information estimated in the encoder and transmitted to the decoder.

Thus, in a 5-to-2 environment, the left transmitted channel or the right transmitted channel are not used directly for the left and right reconstruction but are modified by being combined with the cancellation channel to obtain a modified base channel, which is different from the corresponding transmitted channel. Preferably, an additional weighting factor, which will depend on the downmixing operation performed at an encoder to generate the transmission channels is also included in the cancellation channel calculation. In a 5-to-2 environment, at least two cancellation channels are calculated so that each transmission channel can be combined with a designated cancellation channel to obtain modified base channels for reconstructing the left and the left surround output channels, and the right and right surround output channels, respectively.

The present invention may be incorporated into a number of systems or applications including, for example, digital video players, digital audio players, computers, satellite receivers, cable receivers, terrestrial broadcast receivers, and home entertainment systems.

BRIEF DESCRIPTION OF THE DRAWINGS

Preferred embodiments of the present invention are subsequently described by referring to the enclosed figures, in which:

FIG. 6*a* is a general diagram for illustrating the downmixing operation;

FIG. 6*b* is a circuit diagram for implementing the downmixing operation of FIG. 6*a;*

FIG. 6*c* is a mathematical representation of the downmixing operation;

FIG. 7*a* is a schematic diagram for indicating base channels used for upmixing in a stereo-compatible environment;

FIG. 7*b* is a circuit diagram for implementing a multi-channel reconstruction in a stereo-compatible environment;

FIG. 7*c* is a mathematical presentation of the upmixing matrix used in FIG. 7*b;*

FIG. 7*d* is a mathematical illustration of the level modification for each channel and the subsequent overall normalization;

Before a detailed description of preferred embodiments will be given, the problem underlying the invention and the solution to the problem are described in general terms. The inventive technique for improving the auditory spatial image width for reconstructed output channels is applicable to all cases when an input channel is mixed into more than one of the transmitted channels in a C-to-E parametric multi-channel system. The preferred embodiment is the implementation of the invention in a binaural cue coding (BCC) system. For simplicity of discussion but without loss of generality, the inventive technique is described for the specific case of a BCC scheme for coding/decoding 5.1 surrounds signals in a backwards compatible way.

The before-mentioned problem of auditory image width reduction occurs mostly for audio signals which contain independent fast repeating transients from different directions such as an applause signal of an audience in any kind of live recording. While the image width reduction may, in principle, be addressed by using a higher time resolution for ICLD synthesis, this would result in an increased side information rate and also require a change in the window size of the used analysis/synthesis filterbank. It is to be noted here that this possibility additionally results in negative effects on tonal components, since an increase of time resolution automatically means a decrease of frequency resolution.

Instead, the invention is a simple concept that does not have these disadvantages and aims at reducing the influence of the center channel signal component in the side channels.

As has been discussed in connection with FIGS. 7*a*-7*d*, the base channels for the five reconstructed output channels of 5-to-2 BCC are:

$$\tilde{s}_1(k)=\tilde{y}_1(k)=\tilde{x}_1(k)+\tilde{x}_3(k)/+\sqrt{2}+\tilde{x}_4(k)$$

$$\tilde{s}_2(k)=\tilde{y}_2(k)=\tilde{x}_2(k)+\tilde{x}_3(k)/+\sqrt{2}+\tilde{x}_5(k)$$

$$\tilde{s}_3(k)=\tilde{y}_1(k)+\tilde{y}_2(k)=\tilde{\mathrm{x}}_1(k)+\tilde{x}_2(k)+\sqrt{2}\tilde{x}_3(k)+\tilde{\mathrm{x}}_4(k)+\tilde{\mathrm{x}}$$

$$\tilde{s}_4(k)=\tilde{s}_1(k)$$

$$\tilde{x}_5(k)=\tilde{s}_2(k)$$

It is to be noted that the original center channel signal component $x_3$ appears 3 dB amplified in the center base channel subband $s_3$ (factor $1/\sqrt{2}$) and 3 dB attenuated in the remaining (side channel) base channel subbands.

Figure 2:
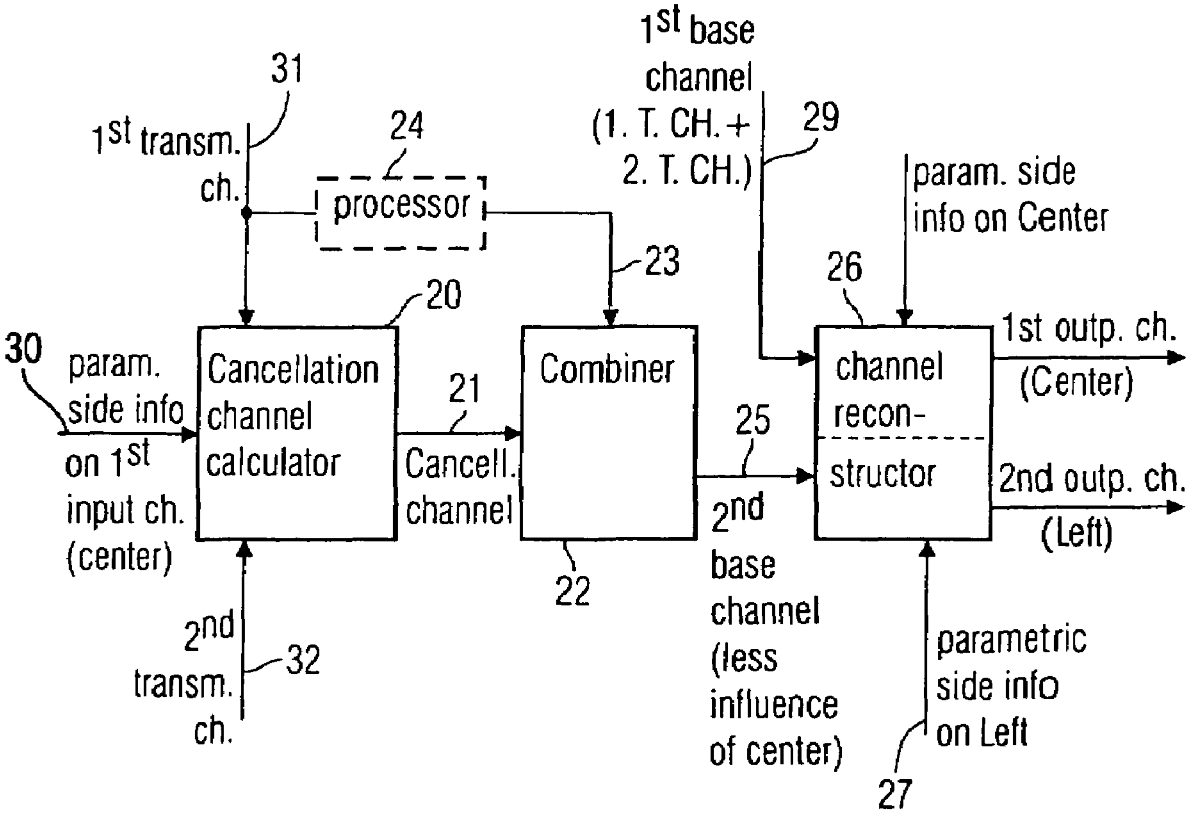
FIG. 2 is a schematic block diagram of the preferred apparatus for generating a multi-channel output signal in accordance with the present invention.

In order to further attenuate the influence of the center channel signal component in the side base channel subbands according to this invention, the following general idea is applied as illustrated in FIG. 2.

An estimate of the final decoded center channel signal is computed by preferably scaling it to the desired target level as described by the corresponding level information such as an ICLD value in BCC environments. Preferably, this decoded center signal is calculated in the spectral domain in order to save computation, i.e. no synthesis filterbank processing is applied.

Additionally, this center decoded signal or center reconstructed signal, which corresponds to the cancellation channel, can be weighted and then combined to both the base channel signals of the other output channels. This combining is preferably a subtraction. Nevertheless, when the weighting factors have a different sign, then an addition also results in the reduction of the influence of the center channel in the base channel used for reconstructing the left or the right output channel. This processing results in forming a modified base channel for reconstruction of left and left surround or for reconstruction of right or right surround. Preferably a weighting factor of −3 dB is preferred, but also any other value is possible.

Instead of the original transmission base channel signals as used in FIG. 7*b*, modified base channel signals are used for the computation of the decoded output channel of the other output channels, i.e. the channels other than the center channel.

In the following, a block diagram of the inventive concept will be discussed by reference to FIG. 2. FIG. 2 shows an apparatus for generating a multi-channel output signal having K output channels, the multi-channel output signal corresponding to a multi-channel input signal having C input channels, using E transmission channels, the E transmission channels representing a result of a downmix operation having the C input channels as an input, and using parametric side information on the input channels, wherein C is ≧2, C is >E, and K is >1 and ≦C.

Additionally, the downmix operation is effective to introduce a first input channel in a first transmission channel and in a second transmission channel. The inventive device includes the cancellation channel calculator 20 to calculate at least one cancellation channel 21, which is input into a combiner 22, which receives, at a second input 23, the first transmission channel directly or a processed version of the first transmission channel. The processing of the first transmission channel to obtain the processed version of the first transmission channel is performed by means of a processor 24, which can be present in some embodiments, but is, in general, optional. The combiner is operated to obtain a second base channel 25 for being input into a channel reconstructor 26.

The channel reconstructor uses the second base channel 25 and parametric side information on the original left input channel, which are input into the channel reconstructor 26 at another input 27, to generate the second output channel. At the output of the channel reconstructor, one obtains a second output channel 28, which might be the reconstructed left output channel, which is, compared to the scenario in FIG. 7*b*, generated by a base channel, which has a small influence or even a totally cancelled influence of the original input center channel compared to the situation in FIG. 7*b*.

While the left output channel generated as shown in FIG. 7*b* includes a certain influence as has been described above, this certain influence is reduced in the second base channel as generated in FIG. 2 because of the combination of the cancellation channel and the first transmission channel or the processed first transmission channel.

As is shown in FIG. 2, the cancellation channel calculator 20 calculates the cancellation channel using information on the original center channel available as a decoder, i.e. information for generating the multi-channel output signal. This information includes parametric side information on the first input channel 30, or includes the first transmission channel 31, which also includes some information on the center channel because of the downmixing operation, or includes the second transmission channel 32, which also includes information on the center channel because of the downmixing operation. Preferably, all this information is used for optimum reconstruction of the center channel to obtain the cancellation channel 21.

Figure 3:
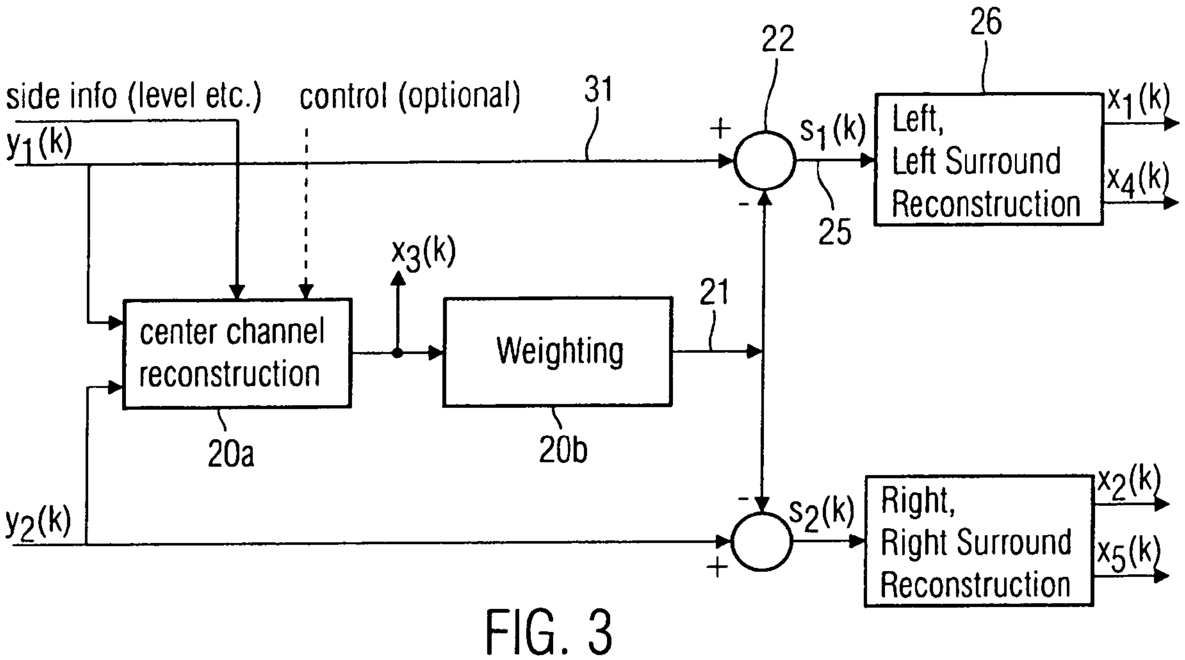
FIG. 3 is a schematic diagram of the inventive apparatus in accordance with a first embodiment of the present invention.

Such an optimum embodiment will subsequently be described with respect to FIG. 3 and FIG. 4. In contrast to FIG. 2, FIG. 3 shows the 2-fold device from FIG. 2, i.e. a device for canceling the center channel influence in the left base channel s1 as well as the right base channel s2. The cancellation channel calculator 20 from FIG. 2 includes a center channel reconstruction device 20*a* and a weighting device 20*b* to obtain the cancellation channel 21 at the output of the weighting device. The combiner 22 in FIG. 2 is a simple subtracter which is operative to subtract the cancellation channel 21 from the first transmission channel 21 to obtain—in terms of FIG. 2—the second base channel 25 for reconstructing the second output channel (such as the left output channel) and, optionally, also the left surround output channel. The reconstructed center channel $x_3(k)$ can be obtained at the output of the center channel reconstruction device 20*a*.

Figure 4:
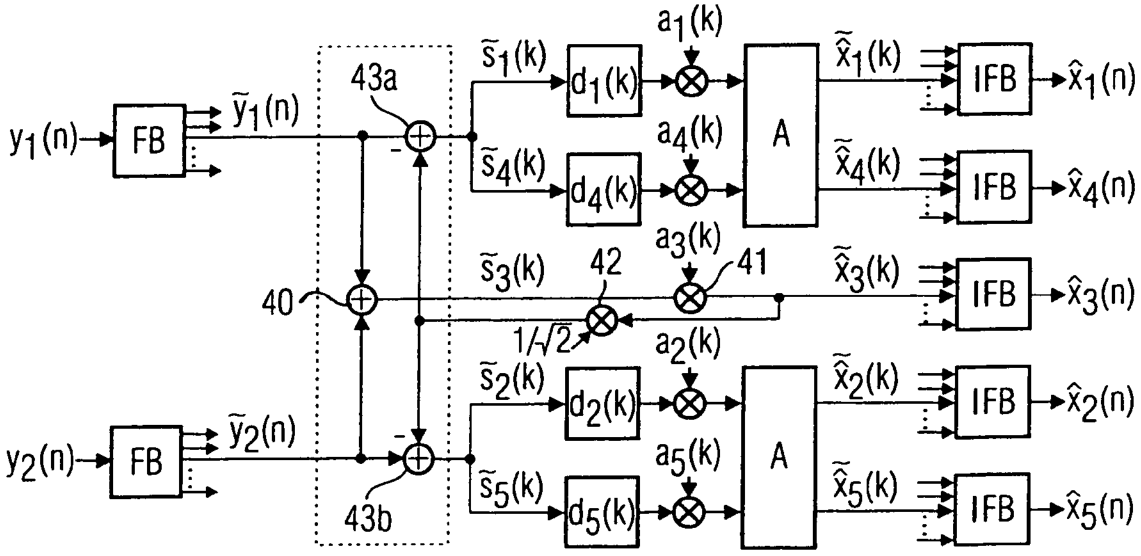
FIG. 4 is a circuit implementation of the preferred embodiment of FIG. 3.

FIG. 4 indicates a preferred embodiment implemented as a circuit diagram, which uses the technique which has been discussed with respect to FIG. 3. Additionally, FIG. 4 shows the frequency-selective processing which is optimally suited for being integrated into a straight forward frequency-selective BCC reconstruction device.

The center channel reconstruction 26 takes place by summing the two transmission channels in a summer 40. Then, the parametric side information for the channel level differences, or the factor $a_3$ derived from the inter-channel level difference as discussed in FIG. 7*d* is used for generating a modified version of the first base channel (in terms of FIG. 2) which is input into the channel reconstructor 26 at the first base channel input 29 in FIG. 2. The reconstructed center channel at the output of the multiplier 41 can be used for center channel output reconstruction (after the general normalization which is described in FIG. 7*d*).

To acknowledge the influence of the center channel in the base channel for the left and the right reconstruction, a weighting factor of $1/\sqrt{2}$ is applied which is illustrated by means of a multiplier 42 in FIG. 4. Then, the reconstructed and again weighted center channel is fed back to the summers 43*a* and 43*b*, which correspond to the combiner 22 in FIG. 2.

Thus, the second base channel $s_1$ or $s_4$ (or $s_2$ and $s_5$) is different from the transmission channel $y_1$ in that the center channel influence is reduced compared to the case in FIG. 7*b*.

The resulting base channel subbands are given in mathematical terms as follows:

$$\tilde{s}_1(k)=\tilde{y}_1(k)-a_3(k)(\tilde{y}_1(k)+\tilde{y}_2(k))/\sqrt{2}$$

$$\tilde{s}_2(k)=\tilde{y}_2(k)-a_3(k)(\tilde{y}_1(k)+\tilde{y}_2(k))/\sqrt{2}$$

$$\tilde{s}_3(k)=\tilde{y}_1(k)+\tilde{y}_2(k)$$

$$\tilde{s}_4(k)=\tilde{s}_1(k)$$

$$\tilde{s}_5(k)=\tilde{s}_2(k)$$

Thus, the FIG. 4 device provides for a subtraction of a center channel subband estimate from the base channels for the side channels in order to improve independence between the channels and, therefore, to provide a better spatial width of the reconstructed output multi-channel signal.

In accordance with another embodiment of the present invention, which will subsequently be described with respect to FIG. 5*a* and FIG. 5*b*, a cancellation channel different from the cancellation channel calculated in FIG. 3 is determined. In contrast to the FIG. 3/FIG. 4 embodiment, the cancellation channel 21 for calculating the second base channel s1(*k*) is not derived from the first transmission channel as well as the second transmission channel but is derived from the second transmission channel y2(*k*) alone using a certain weighting factor x_lr, which is illustrated by the multiplication device 51 in FIG. 5*a*. Thus, the cancellation channel 21 in FIG. 5*a* is different from the cancellation channel in FIG. 3, but also contributes to a reduction of the center channel influence on the base channel s1(*k*) used for reconstructing the second output channel, i.e. the left output channel x1(*k*).

Figure 1:
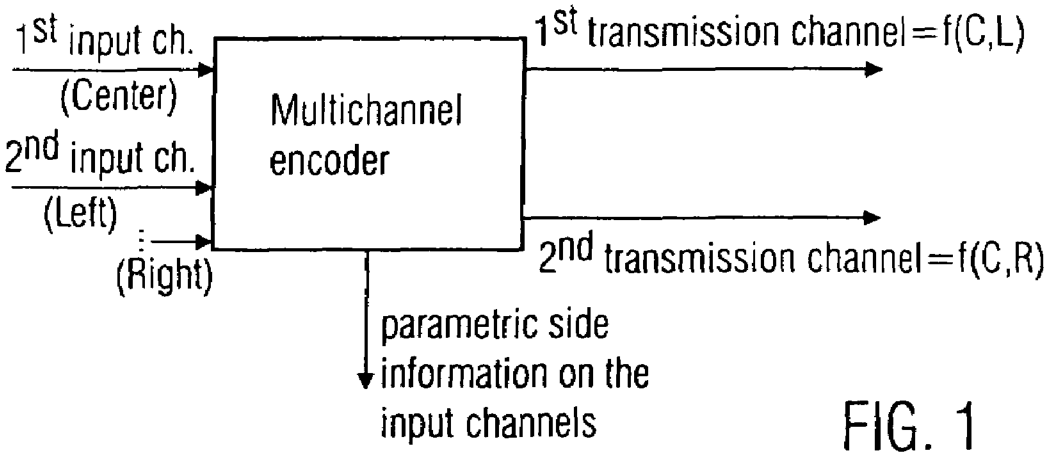
FIG. 1 is a block diagram of a multi-channel encoder producing transmission channels and parametric side information on the input channels.
Figures 5A, 5B:
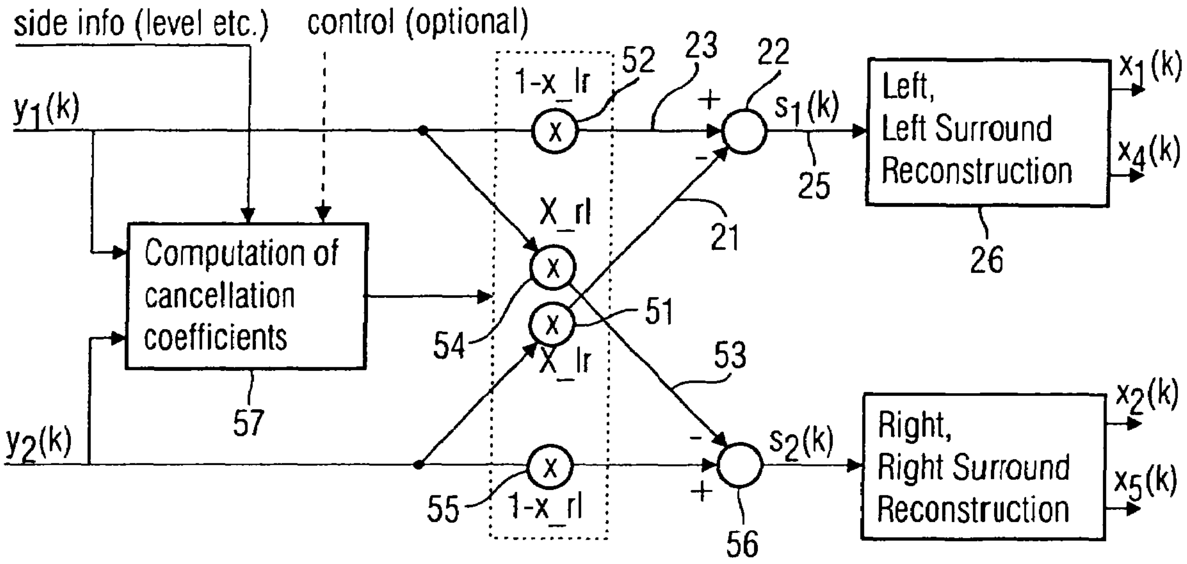
FIG. 5*a* is a block diagram of the inventive apparatus in accordance with a second embodiment of the present invention.
FIG. 5*b* is a mathematical representation of the dynamic upmixing as shown in FIG. 5*a;*
Figure 8:
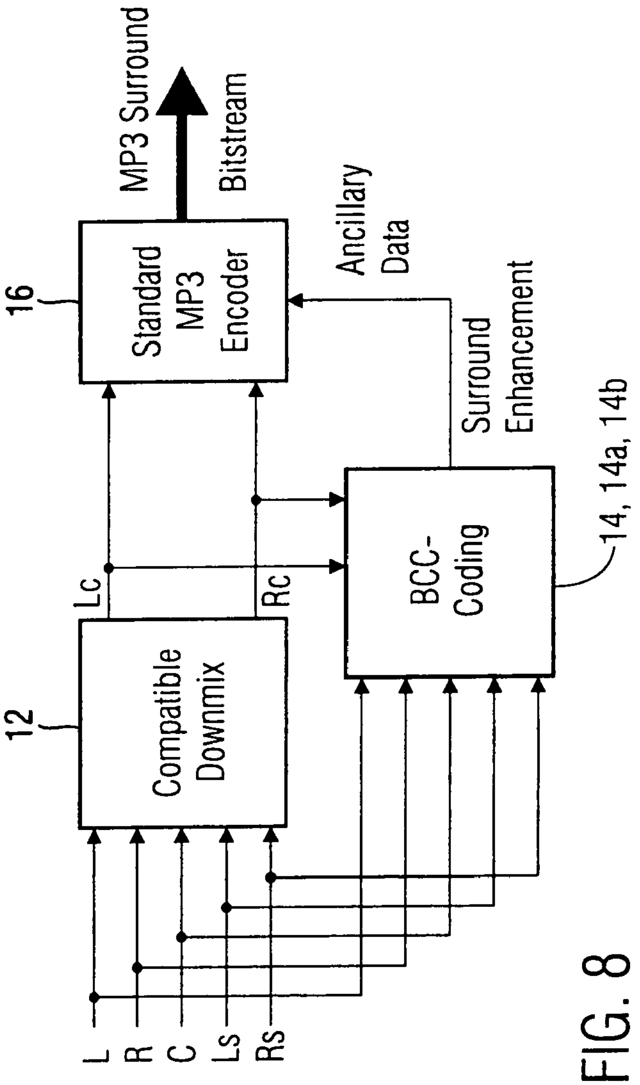
FIG. 8 illustrates an encoder.
Figure 9:
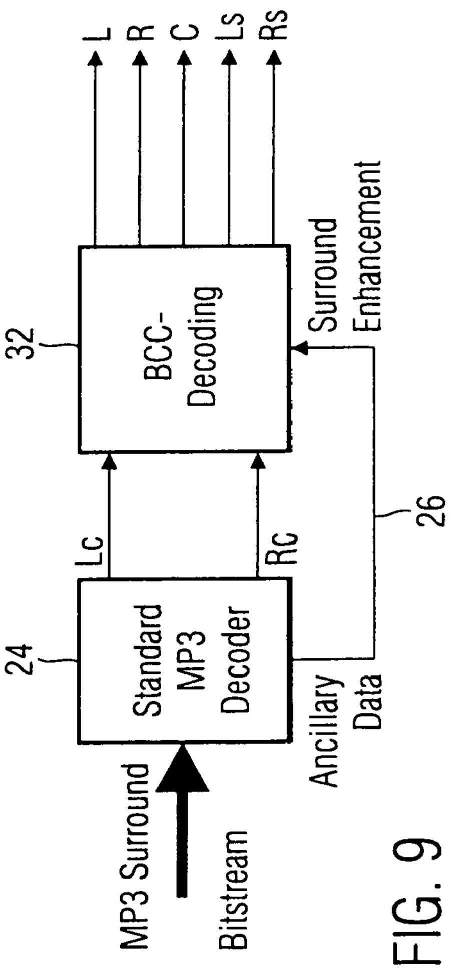
FIG. 9 illustrates a decoder.
Figure 10:
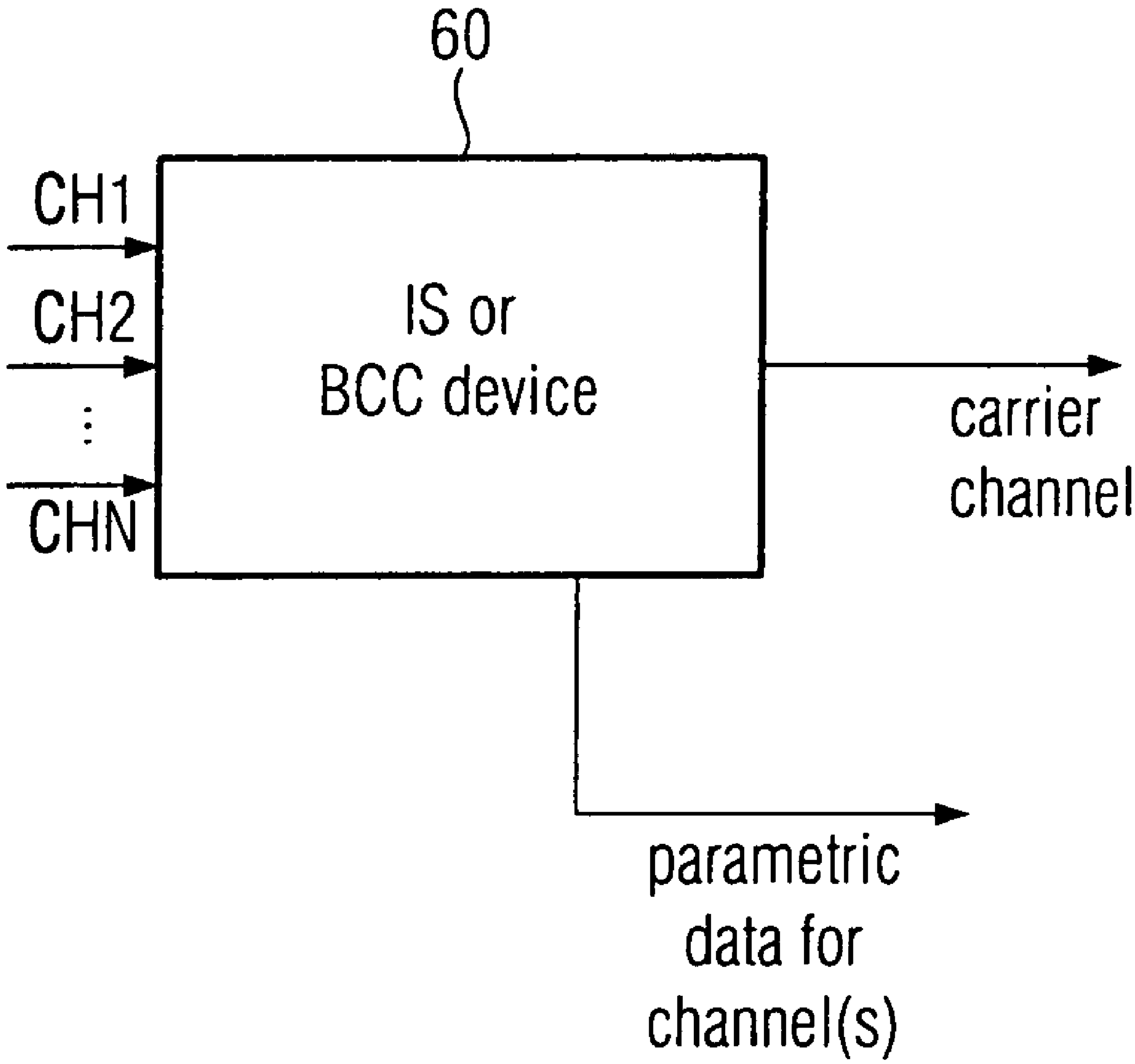
FIG. 10 (Prior Art)
FIG. 10 illustrates a prior art joint stereo encoder.
Figure 11:
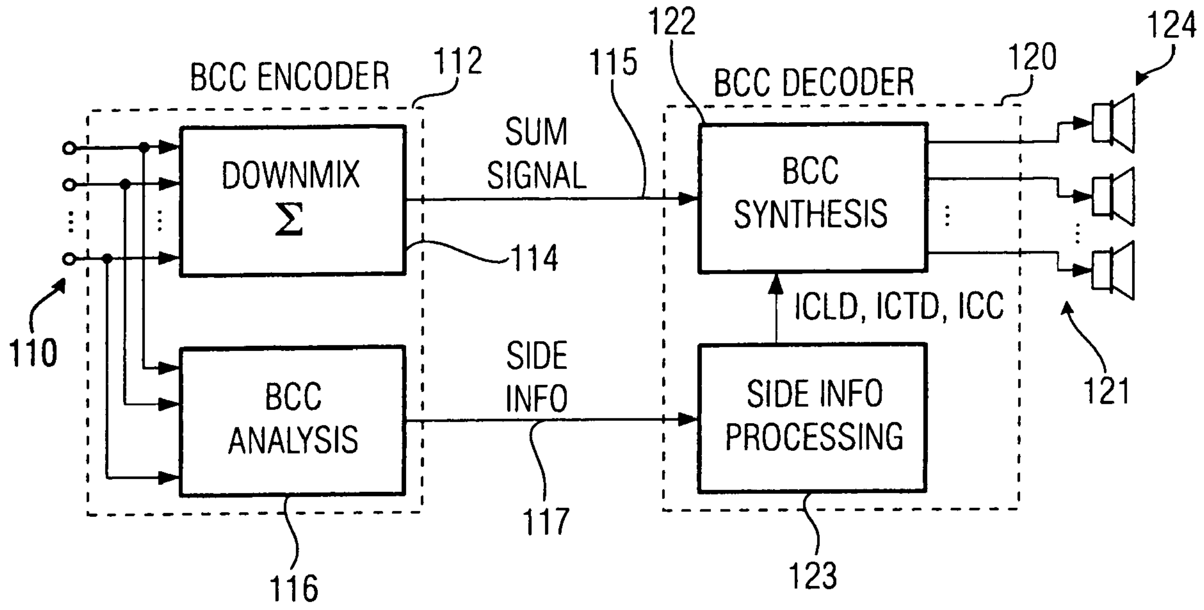
FIG. 11 (Prior Art)
FIG. 11 is a block diagram representation of a prior art BCC encoder/decoder system.
Figure 12:
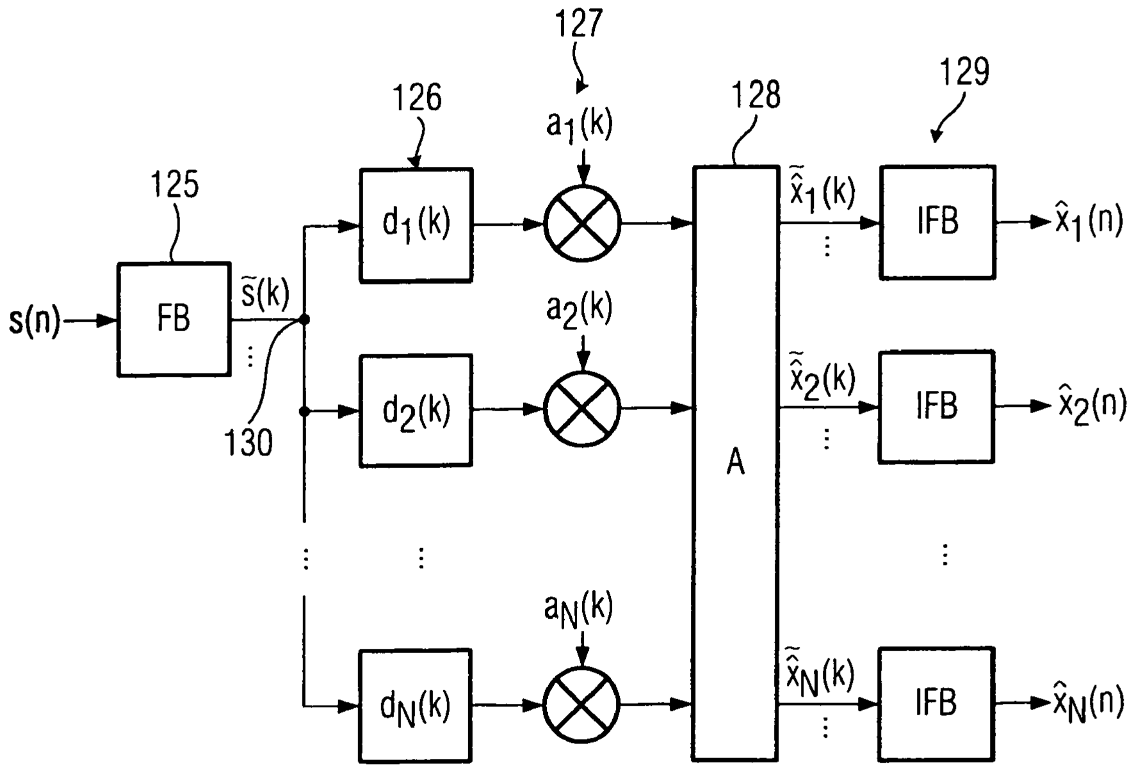
FIG. 12 (Prior Art)
FIG. 12 is a block diagram of a prior art implementation of a BCC synthesis block of FIG. 11.
Figure 13:
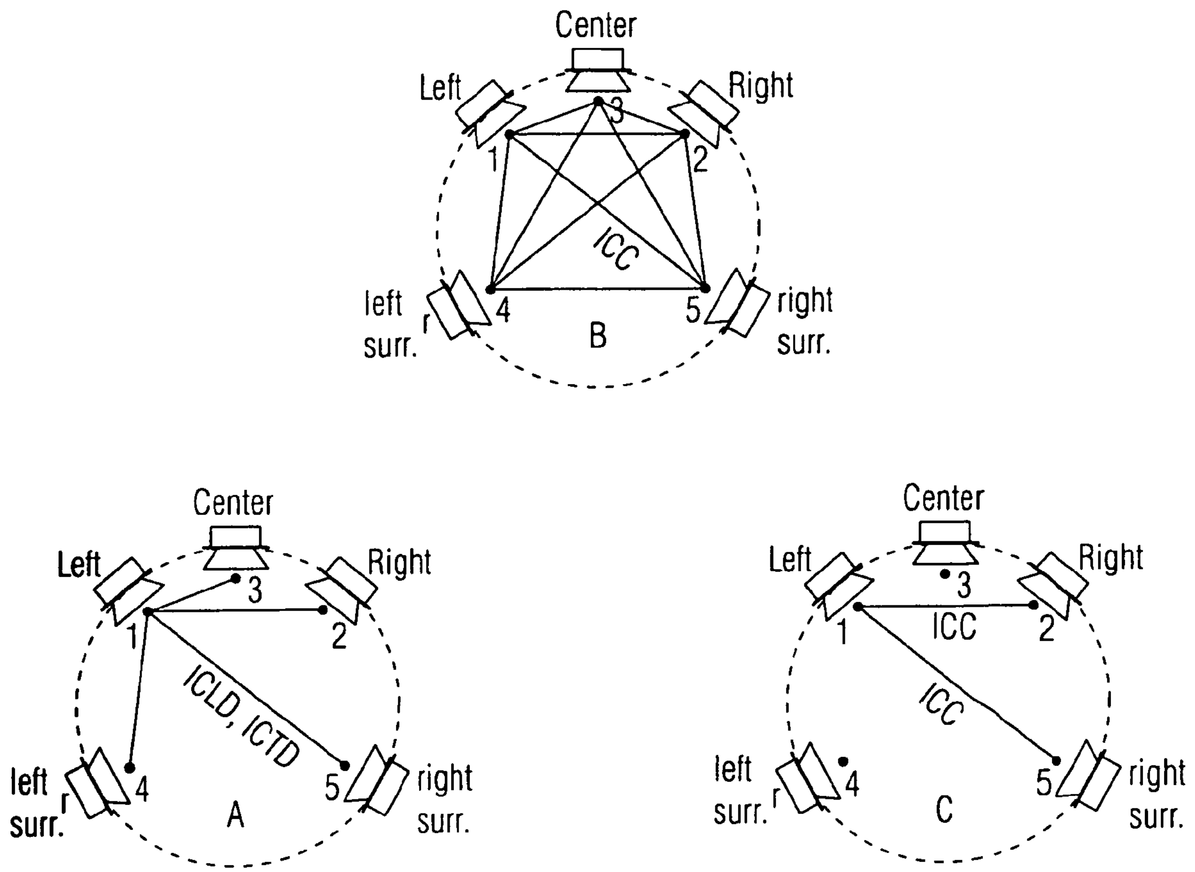
FIG. 13 (Prior Art)
FIG. 13 is a representation of a well-known scheme for determining ICLD, ICTD and ICC parameters.

In the FIG. 5*a* embodiment, also a preferred embodiment of the processor 24 is shown. In particular, the processor 24 is implemented as another multiplication device 52, which applies a multiplication by a multiplication factor (1−x_lr). Preferably, as is shown in FIG. 1*a*, the multi-plication factor applied by the processor 24 to the first transmission channel depends on the multiplication factor 51, which is used for multiplying the second transmission channel to obtain the cancellation channel 21. Finally, the processed version of the first transmission channel at an input 23 to the combiner 22 is used for combining, which consists in subtracting the cancellation channel 21 from the processed version of the first transmission channel. All this again results in the second base channel 25, which has a reduced or a completely cancelled influence of the original center input channel.

As it is shown in FIG. 5*a*, the same procedure is repeated to obtain the third base channel s2(*k*) at an input into the right/right surround reconstruction device. However, as it is shown in FIG. 5*a*, the third base channel s2(*k*) is obtained by combining the processed version of the second transmission channel y(k) and another cancellation channel 53, which is derived from the first transmission channel y1(*k*) through multiplication in a multiplication device 54, which has a multiplication factor x_rl, which can be identical to x_lr for a device 51, but which can also be different from this value. The processor for processing the second transmission channel as indicated in FIG. 5*a* is a multiplication device 55. The combiner for combining the second cancellation channel 53 and the processed version of the second transmission channel y2(*k*) is illustrated by reference number 56 in FIG. 5*a*. The cancellation channel calculator from FIG. 2 further includes a device for computing the cancellation coefficients, which is indicated by reference number 57 in FIG. 5*a*. The device 57 is operative to obtain parametric side information on the original or input center channel such as inter-channel level difference, etc. The same is true for the device 20*a* in FIG. 3, where the center channel reconstruction device 20*a* also includes an input for receiving parametric side information such as level values or inter-channel level differences, etc.

The following Equation $$\tilde{s}_1(k) = \tilde{y}_1(k) - a_3(k)(\tilde{y}_1(k) + \tilde{y}_2(k))/\sqrt{2} = \left(1 - \frac{a_3}{\sqrt{2}}\right)\tilde{y}_1(k) - \frac{a_3}{\sqrt{2}}\tilde{y}_2(k)$$

$$\tilde{s}_2(k) = \tilde{y}_2(k) - a_3(k)(\tilde{y}_1(k) + \tilde{y}_2(k))/\sqrt{2} = \left(1 - \frac{a_3}{\sqrt{2}}\right)\tilde{y}_2(k) - \frac{a_3}{\sqrt{2}}\tilde{y}_1(k)$$

$$x_{lr} = x_{rl} = \frac{a_3}{\sqrt{2}}$$

shows the mathematical description of the FIG. 5*a* embodiment and illustrates, on the right side thereof, the cancellation processing in the cancellation channel calculator on the one hand and the processors (21, 24 in FIG. 2) on the other hand. In this specific embodiment, which is illustrated here, the factors x_lr and x_rl are identical to each other.

The above embodiment makes clear that the invention includes a composition of the reconstruction base channels as a signal-adaptive linear combination of the left and the right transmitted channels. Such a topology is illustrated in FIG. 5*a*.

When viewed from a different angle, the inventive device can also be understood as a dynamic upmixing procedure, in which a different upmixing matrix for each subband and each time instance k is used. Such a dynamic upmixing matrix is illustrated in FIG. 5*b*. It is to be noted that for each subband, i.e. for each output of the filterbank device in FIG. 4, such an upmixing matrix U exists. Regarding the time-dependent manner, it is to be noted that FIG. 5*b* includes the time index k. When one has level information for each time index, the upmixing matrix would change from each time instance to the next time instance. When, however, the same level information $a_3$ is used for a complete block of values transformed into a frequency representation by the input filterbank FB, then one value $a_3$ will be present for a complete block of e.g. 1024 or 2048 sampling values. In this case, the upmixing matrix would change in the time direction from block to block rather than from value to value. Nevertheless, techniques exist for smoothing parametric level values so that one may obtain different amplitude modification factors $a_3$ during upmixing in a certain frequency band.

Stated generally, one could also use different factors for computation of the output center channel subbands and the factors for "dynamic upmixing", resulting in a factor $a_3$, which is a scaled version of $a_3$ as computed above.

In a preferred embodiment, the weighting strength of the center component cancellation is adaptively controlled by means of an explicit transmission of side information from the encoder to the decoder. In this case, the cancellation channel calculator 20 shown in FIG. 2 will include a further control input, which receives an explicit control signal which could be calculated to indicate a direct interdependence between the left and the center or the right and the center channel. In this regard, this control signal would be different from the level differences for the center channel and the left channel, because these level differences are related to a kind of a virtual reference channel, which could be the sum of the energy in the first transmission channel and the sum of the energy in the second transmission channel as it is illustrated at the top of FIG. 7*d*.

Such a control parameter could, for example, indicate that the center channel is below a threshold and is approaching zero, while there is a signal in the left or the right channel, which is above the threshold. In this case, an adequate reaction of the cancellation channel calculator to a corresponding control signal would be to switch off channel cancellation and to apply a normal upmixing scheme as shown in FIG. 7*b* for avoiding "over-cancellation" of the center channel, which is not present in the input. In this regard, this would be an extreme kind of controlling the weighting strength as outlined above.

Preferably, as becomes clear from FIG. 4, no time delay processing operation is performed for calculating the reconstruction center channel. This is advantageous in that the feedback works without having to take into consideration any time delays. Nevertheless, this can be obtained without loss of quality, when the original center channel is used as the reference channel for calculating the time differences $d_i$. The same is true for any correlation measure. It is preferred not to perform any correlation processing for reconstructing the center channel. Depending on the kind of correlation calculation, this can be done without loss of quality, when the original center channel is used as a reference for any correlation parameters.

It is to be noted that the invention does not depend on a certain downmix scheme. This means that one can use an automatic downmix or a manual downmix scheme performed by a sound engineer. One can even use automatically generated parametric information together with manually generated downmix channels.

Depending on the application environment, the inventive methods for constructing or generating can be implemented in hardware or in software. The implementation can be a digital storage medium such as a disk or a CD having electronically readable control signals, which can cooperate with a programmable computer system such that the inventive methods are carried out. Generally stated, the invention therefore, also relates to a computer program product having a program code stored on a machine-readable carrier, the program code being adapted for performing the inventive methods, when the computer program product runs on a computer. In other words, the invention, therefore, also relates to a computer program having a program code for performing the methods, when the computer program runs on a computer.

The present invention may be used in conjunction with or incorporated into a variety of different applications or systems including systems for television or electronic music distribution, broadcasting, streaming, and/or reception. These include systems for decoding/encoding transmissions via, for example, terrestrial, satellite, cable, internet, intranets, or physical media (e.g.—compact discs, digital versatile discs, semiconductor chips, hard drives, memory cards and the like). The present invention may also be employed in games and game systems including, for example, interactive software products intended to interact with a user for entertainment (action, role play, strategy, adventure, simulations, racing, sports, arcade, card and board games) and/or education that may be published for multiple machines, platforms or media. Further, the present invention may be incorporated in audio players or CD-ROM/DVD systems. The present invention may also be incorporated into PC software applications that incorporate digital decoding (e.g.—player, decoder) and software applications incorporating digital encoding capabilities (e.g.—encoder, ripper, recoder, and jukebox).

The invention claimed is:

1. Apparatus for generating a multi-channel output signal having K output channels, the multi-channel output signal corresponding to a multi-channel input signal having C input channels, using E transmission channels, the E transmission channels representing a result of a downmix operation having C input channels as an input, and using parametric information related to the input channels, wherein E is $\geqq 2$, C is $>$E, and K is $>1$ and $\leqq$C, and wherein the downmix operation is effective to introduce a first input channel in a first transmission channel and in a second transmission channel, and to additionally introduce a second input channel in the first transmission channel, comprising:

a cancellation channel calculator for calculating a cancellation channel using information related to the first input channel included in the first transmission channel, the second transmission channel or the parametric information;

a combiner for combining the cancellation channel and the first transmission channel or a processed version thereof to obtain a second base channel, in which an influence of the first input channel is reduced compared to the influence of the first input channel on the first transmission channel; and a channel reconstructor for reconstructing a second output channel corresponding to the second input channel using the second base channel and parametric information related to the second input channel, and for reconstructing a first output channel corresponding to the first input channel using a first base channel being different from the second base channel in that the influence of the first channel is higher compared to the second base channel, and parametric information related to the first input channel.

2. Apparatus in accordance with claim 1, in which the combiner is operative to subtract the cancellation channel from the first transmission channel or the processed version thereof.

3. Apparatus in accordance with claim 1, in which the cancellation channel calculator is operative to calculate an estimate for the first input channel using the first transmission channel and the second transmission channel to obtain the cancellation channel.

4. Apparatus in accordance with claim 1, in which the parametric information includes a difference parameter between the first input channel and a reference channel, and in which the cancellation channel calculator is operative to calculate a sum of the first transmission channel and the second transmission channel and to weight the sum using the difference parameter.

5. Apparatus in accordance with claim 1, in which the downmix operation is such that the first input channel is introduced into the first transmission channel after being scaled by a downmix factor, and in which the cancellation channel calculator is operative to scale the sum of the first and the second transmission channels using a scaling factor, which depends on the downmix factor.

6. Apparatus in accordance with claim 5, in which the weighting factor is equal to the downmix factor.

7. Apparatus in accordance with claim 1, in which the cancellation channel calculator is operative to determine a sum of the first and the second transmission channels to obtain the first base channel.

8. Apparatus in accordance with claim 1, further comprising a processor which is operative to process the first transmission channel by weighting using a first weighting factor, and in which the cancellation channel calculator is operative to weight the second transmission channel using a second weighting factor.

9. Apparatus in accordance with claim 8, in which the parametric information includes the difference parameter between the first input channel and a reference channel, and in which the cancellation channel calculator is operative to determine the second weighting factor based on a difference parameter.

10. Apparatus in accordance with claim 8, in which the first weighting factor is equal to $(1-h)$, wherein h is a real value, and in which the second weighting factor is equal to h.

11. Apparatus in accordance with claim 10, in which the parametric information includes a level difference value, and wherein h is derived from the parametric level difference value.

12. Apparatus in accordance with claim 11, in which h is equal to a value derived from the level difference divided by a factor depending on the downmix operation.

13. Apparatus in accordance with claim 10, in which the parametric information includes the level difference between the first channel and the reference channel, and in which h is equal to $1\sqrt{2\times10^{L/20}}$, wherein L is the level difference.

14. Apparatus in accordance with claim 1, in which the parametric information further includes a control signal dependent on the relation between the first input channel and the second input channel, and in which the cancellation channel calculator is controlled by the control signal to actively increase or decrease an energy of the cancellation channel or even disable the cancellation channel calculation at all.

15. Apparatus in accordance with claim 1, in which the downmix operation is further operative to introduce a third input channel into the second transmission channel, the apparatus further comprising a further combiner for combining the cancellation channel and the second transmission channel or a processed version thereof to obtain a third base channel, in which an influence of the first input channel is reduced compared to the influence of the first input channel on the second transmission channel; and a channel reconstructor for reconstructing the third output channel corresponding to the third input channel using the third base channel and parametric information related to the third input channel.

16. Apparatus in accordance with claim 1, in which the parametric information includes inter-channel level differences, inter-channel time differences, inter-channel phase differences or inter-channel correlation values, and in which the channel reconstructor is operative to apply any one of the parameters of the above group on a base channel to obtain a raw output channel.

17. Apparatus in accordance with claim 16, in which the channel reconstructor is operative to scale the raw output channel so that the total energy in the final reconstructed output channel is equal to the total energy of the E transmission channels.

18. Apparatus in accordance with claim 1, in which the parametric information is given band wise, and in which the cancellation channel calculator, the combiner and the channel reconstructor are operative to process the plurality of bands using band wise-given parametric information, and in which the apparatus further comprises a time/frequency conversion unit for converting the transmission channels into a frequency representation having frequency bands, and a frequency/time conversion unit for converting reconstructed frequency bands into the time domain.

19. The apparatus of claim 1 further comprising:

a system selected from the group consisting of a digital video player, a digital audio player, a computer, a satellite receiver, a cable receiver, a terrestrial broadcast receiver, and a home entertainment system; and wherein the system comprises the channel calculator, the combiner, and the channel reconstructor.

20. Method of generating a multi-channel output signal having K output channels, the multi-channel output signal corresponding to a multi-channel input signal having C input channels, using E transmission channels, the E transmission channels representing a result of a downmix operation having C input channels as an input, and using parametric information related to the input channels, wherein E is ≧2, C is >E, and K is >1 and ≦C, and wherein the downmix operation is effective to introduce a first input channel in a first transmission channel and in a second transmission channel, and to additionally introduce a second input channel in the first transmission channel, comprising:

calculating a cancellation channel using information related to the first input channel included in the first transmission channel, the second transmission channel or the parametric information;

combining the cancellation channel and the first transmission channel or a processed version thereof to obtain a second base channel, in which an influence of the first input channel is reduced compared to the influence of the first input channel on the first transmission channel; and reconstructing a second output channel corresponding to the second input channel using the second base channel and parametric information related to the second input channel, and a first output channel corresponding to the first input channel using a first base channel being different from the second base channel in that the influence of the first channel is higher compared to the second base channel, and parametric information related to the first input channel.

21. Computer program having a program code for implementing, when running on a computer, a method for generating a multi-channel output signal having K output channels, the multi-channel output signal corresponding to a multi-channel input signal having C input channels, using E transmission channels, the E transmission channels representing a result of a downmix operation having C input channels as an input, and using parametric information related to the input channels, wherein E is ≧2, C is >E, and K is >1 and ≦C, and wherein the downmix operation is effective to introduce a first input channel in a first transmission channel and in a second transmission channel, and to additionally introduce a second input channel in the first transmission channel, the method comprising:

calculating a cancellation channel using information related to the first input channel included in the first transmission channel, the second transmission channel or the parametric information;

combining the cancellation channel and the first transmission channel or a processed version thereof to obtain a second base channel, in which an influence of the first input channel is reduced compared to the influence of the first input channel on the first transmission channel; and reconstructing a second output channel corresponding to the second input channel using the second base channel and parametric information related to the second input channel, and a first output channel corresponding to the first input channel using a first base channel being different from the second base channel in that the influence of the first channel is higher compared to the second base channel, and parametric information related to the first input channel.

* * * * *